(12) United States Patent
Nokkonen et al.

(10) Patent No.: US 8,487,583 B2
(45) Date of Patent: Jul. 16, 2013

(54) CONNECTION TO A USB DEVICE DEPENDENT ON DETECTED BATTERY CRITERION

(75) Inventors: Erkki Nokkonen, Tampere (FI); Pasi Palojarvi, Oulu (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 12/593,021

(22) PCT Filed: Mar. 29, 2007

(86) PCT No.: PCT/IB2007/051125
§ 371 (c)(1),
(2), (4) Date: Dec. 22, 2009

(87) PCT Pub. No.: WO2008/120044
PCT Pub. Date: Oct. 9, 2008

(65) Prior Publication Data
US 2010/0090644 A1    Apr. 15, 2010

(51) Int. Cl.
*H01M 10/44* (2006.01)
*H01M 10/46* (2006.01)
(52) U.S. Cl.
USPC ......................................................... 320/107
(58) Field of Classification Search
USPC .................. 320/107, 111, 112, 114, 132, 149
See application file for complete search history.

(56) References Cited

U.S. PATENT DOCUMENTS

| | | | |
|---|---|---|---|
| 2004/0164708 A1* | 8/2004 | Veselic et al. | 320/132 |
| 2005/0221894 A1* | 10/2005 | Lum et al. | 463/37 |
| 2006/0139002 A1 | 6/2006 | Zemke et al. | 320/128 |
| 2006/0230293 A1 | 10/2006 | Veselic | 713/300 |

FOREIGN PATENT DOCUMENTS

| | | |
|---|---|---|
| EP | 1 710 662 A1 | 10/2006 |
| EP | 1 775 652 A1 | 4/2007 |
| KR | 2007-0031460 (A) | 3/2007 |

* cited by examiner

*Primary Examiner* — Edward Tso
(74) *Attorney, Agent, or Firm* — Harrington & Smith (57) ABSTRACT

An apparatus includes a connector, for providing a physical connection to a USB device, a detection circuit, operable to detect attachment of a USB device; and a charging circuit, for charging a battery of a portable device using current drawn from a USB device, the charging circuit being operable, if it is detected that a USB device is attached, to generate a start-up request signal. The apparatus has a charging mode in which power is provided by the charging circuit to the battery, and a USB connection mode for providing a USB connection. The apparatus also includes a control unit, operable in response to the start-up request signal to determine whether power supplied by the battery meets a predetermined criterion. The control unit is also operable, if it is determined that the predetermined criterion is not met, to control the apparatus to be in the charging mode and prevent the apparatus from entering the USB connection mode and operable, if it is determined that predetermined criterion is met, to control the apparatus to enter the USB connection mode.

20 Claims, 6 Drawing Sheets

CONNECTION TO A USB DEVICE DEPENDENT ON DETECTED BATTERY CRITERION

The present invention relates to apparatus for connecting a portable device to a USB device and a method of controlling a portable device.

Portable devices, such as mobile telephones and personal music players, can be connected to a host device via a USB connection. These portable devices are commonly powered by means of a rechargeable battery. Whilst the portable device is attached to the host device, its battery can be recharged and data can be transferred between the host device and the portable device. The procedures for transferring data and limitations for drawing current from a host device are described in the USB specification version 2.0.

According to the USB specification, to be a host a device must have certain characteristics. These characteristics include storage for a large number of device drivers, the ability to source a large current, and a series "A" host connector receptacle. Conventionally, the host device is a personal computer (PC).

The On-The-Go (OTG) supplement to the USB specification allows devices that do not have these characteristics, such as portable devices, to act as USB hosts. This can allow two portable devices to be connected to one another for data transfer, for example for transferring data from a camera to a mobile telephone.

Thus, portable devices can be charged by connecting them to a USB host or hub, or even to another portable device. Portable devices can also be charged using a dedicated USB charger. This is a module that connects to a mains power supply and provides a charging current through a USB connection to a portable device. The requirements for battery charging and for charger detection are described in the USB battery charging specification 1.0.

Figure 1:
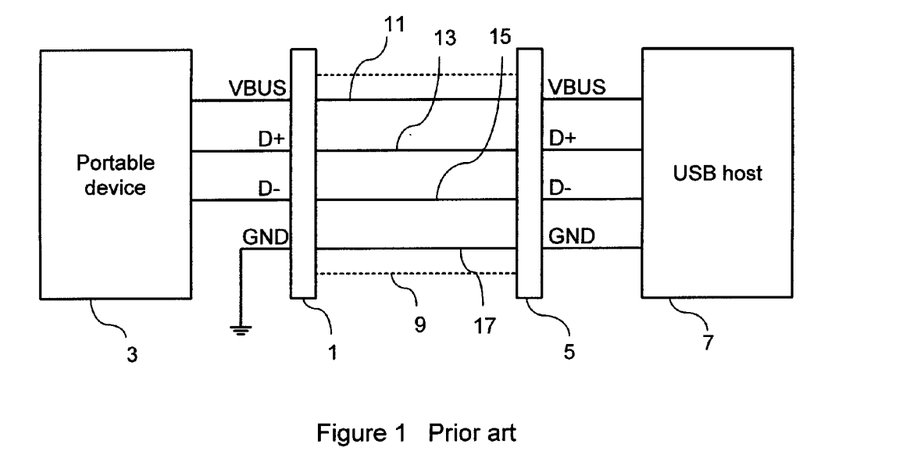
FIG. 1 is a schematic of a prior art connection between a portable device 3 and a USB host 7.

Referring to FIG. 1, a connector 1 of a portable device 3 can be attached to a connector 5 of a USB host 7 by means of a USB cable 9. The USB host 7 may be replaced with a USB hub, another portable device or a USB charger, such as a dedicated charger, a host charger or a hub charger. The USB cable 9 comprises four lines. A VBUS line 11 supplies power to the portable device 3. A D+ and a D− data line 13, 15 transfer data between the portable device 3 and the USB device 7. A ground line 17 is also provided.

It will be understood that the portable device 3 and the USB device 7 are attached when there is a physical link between the portable device 3 and the USB host 7, in this case by means of the USB cable 9. There is a connection between the devices when the portable device 3 drives the data lines 13, 15 to communicate with the USB host 7. Thus, the portable device 3 and the USB host 7 can be attached but not connected. When the portable device 3 is attached to the USB host 7, a connection procedure, which is set out in the USB specification, should be followed to provide a data connection between the portable device 3 and the USB host 7.

Figure 2:
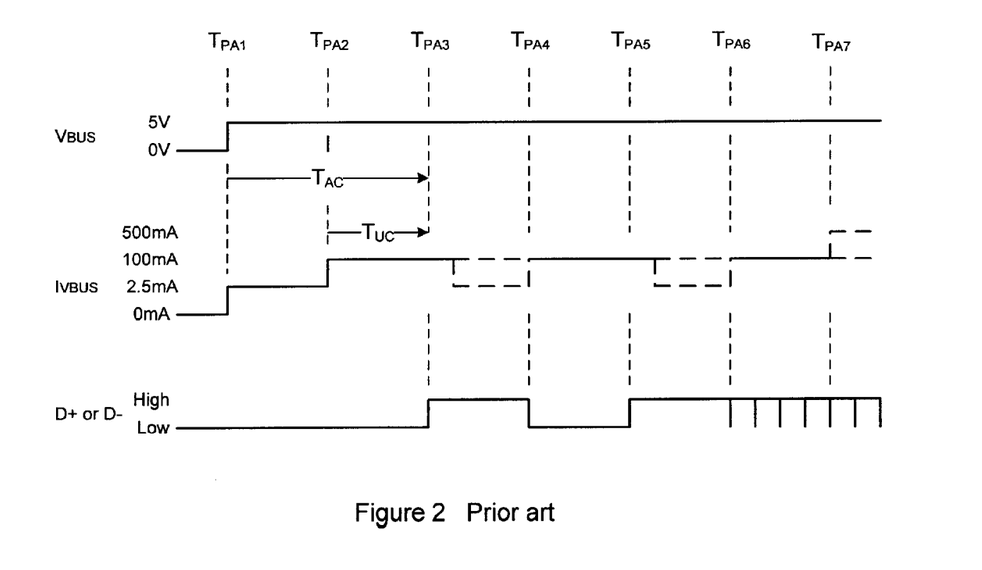
FIG. 2 illustrates a prior art USB connection procedure.

Referring now to FIGS. 1 and 2, when the portable device 3 is attached to the USB host 7 at time $T_{P41}$, the VBUS line 11 at the portable device 3 rises from 0V to 5V. The portable device 3 is allowed to draw up to 2.5 mA current from the USB device 7 over the VBUS line 11. The voltage on the VBUS line 11 is detected by the portable device 3, and in response the portable device 3 attempts to connect with the USB host 7. If the portable device 3 is at that time powered down, the portable device 3 attempts to power up and connect with the host.

At time $T_{P42}$, the USB specification allows the portable device 3 to draw up to 100 mA current from the VBUS line 11 for a maximum of 100 ms.

Within 100 ms, at time $T_{P43}$, the device commences connection with the USB host 7 by starting an enumeration procedure. Enumeration is controlled by the USB host 7, which identifies and manages the device state changes, such as receiving a unique address and configuration. First, either the D+ data line 13 or the D− data line 15 is driven high. During connection, the current that the portable device 3 is allowed to draw over the VBUS line 11 can be up to 100 mA, although it must drop to 2.5 mA if there is no bus activity for 3 ms. This is known as suspend mode.

At time $T_{P44}$, the D+ data line 13 or the D− data line 15 is driven low, for resetting the bus. When the bus has completed resetting, at time $T_{P45}$ the data line is once again driven high. After receiving the reset, the portable device 3 is addressable at a default address. If at any time during this procedure there is no bus activity for 3 ms, the portable device 3 goes into suspend mode.

At time $T_{P46}$, a start-of-frame (SOF) packet is issued by the USB host 7. The SOF packet consists of a packet identification indicating the packet type followed an 11-bit frame number field. This assigns a unique address to the portable device 3.

From time $T_{P43}$, the USB specification allows the portable device 3 to draw 100 mA from the USB host 7 for 500 ms or until the first SOF, whichever comes first. After this, the current must be dropped to the suspend mode current. At time $T_{P47}$ the portable device 3 is configured and enumeration in complete. After enumeration, the current drawn by the portable device 3 over the VBUS line 11 can increase to a maximum of 500 mA, if so configured by the USB host 7.

Although time $T_{UC}$ between drawing 100 mA and commencing connection is limited to 100 ms, time $T_{AC}$ between attaching the USB host 7 to the portable device 3 and commencing connection is not limited. In addition, the USB battery charging specification 1.0 allows time $T_{UC}$ to be increased if the current is required to enable the portable device 3 to power up and connect.

The USB specification requires that the portable device 3 enters suspend mode, in which only a limited current is allowed to be drawn by the portable device 3, if there is no bus activity for 3 ms. Thus, charging of the battery is not practically possible during the connection procedure and, it is preferable that there is sufficient stored energy before the start of connection (i.e. before $TP_{43}$) to power the portable device 3 for the duration of the USB connection procedure.

Charging during and immediately after connection should be software controlled, so that it can be ensured that the current drawn by the portable device 3 is compliant with the limitations imposed by USB specification. However, in some cases there may not be enough stored energy in the battery of the portable device 3 to power-up USB software components of the portable device 3. Since the USB specification allows 100 mA to be provided for a maximum of only 100 ms, it may not be possible to provide enough energy to the battery before connection to allow power-up of the portable device. If there is not enough power in the battery to power software that controls charging, the charging hardware may not be able to be controlled to enter suspend mode when required, in violation of the USB spec. For these reasons, it may be impossible to charge an empty battery using the above-described procedure.

The above-described procedure can also be problematic in the case of certain portable devices 3 that are provided without some or all the software required for controlling USB connection, charging and data transfer, as well as other functions of the portable device 3. Before software controlled charging can occur, the software must be downloaded and installed on the portable device 3, for example by means of flash programming via USB. However, if there is not enough energy stored in the battery to control the flash programming, software controlled charging after USB connection (i.e. in accordance with the USB specification), as well as any other software controlled functions of the device, will not be possible.

The present invention seeks to provide an apparatus and method for connecting a USB device that is able to provide a connection even when a battery of the portable device is empty.

According to a first aspect of the present invention, there is provided apparatus comprising: a connector, for providing a physical connection to a USB device, a detection circuit, operable to detect attachment of a USB device; a charging circuit, for charging a battery of a portable device using current drawn from a USB device, the charging circuit being operable, if it is detected that a USB device is attached, to generate a start-up request signal; wherein the apparatus has a charging mode in which power is provided by the charging circuit to the battery, and a USB connection mode for providing a USB connection, and wherein the apparatus further comprises: a control unit, operable in response to the start-up request signal to determine whether power supplied by the battery meets a predetermined criterion, and operable, if it is determined that the predetermined criterion is not met, to control the apparatus to be in the charging mode and prevent the apparatus from entering the USB connection mode and operable, if it is determined that predetermined criterion is met, to control the apparatus to enter the USB connection mode.

By delaying connection and continuing charging the battery until the predetermined criterion is met, it can be ensured that USB connection is possible when the portable device has an empty or weak battery.

The control unit may be operable to provide a battery status signal to the charging circuit, the battery status signal indicating whether the predetermined criterion is met. This can allow the charging circuit to determine whether to carry out further charging of the battery.

The control unit may be further operable to control powering-up of the portable device prior to entering the USB connection mode. The predetermined criterion may be that the power supplied by the battery is sufficient to power-up the portable device. The power supplied by the battery is sufficient if it is sufficient to power-up at least components of the portable device that are required for USB connection.

The control unit may be operable to enter the apparatus into a second charging mode after completion of the connection mode, and the apparatus may further comprise charging software, the charging software being operable to control the charging circuit in the second charging mode. Thus, after USB connection charging of the battery can be controlled to be compliant with the USB specification.

The apparatus may further comprise USB connection hardware and the control unit may be further operable to prevent the USB connection hardware from detecting attachment of the USB device whilst the apparatus is in the charging mode. Since the USB connection hardware does not detect attachment of the USB device, it does not attempt to connect with the USB device.

According to a second aspect of the invention there is provided a method of controlling a portable device comprising a battery, the portable device having a charging mode in which power is provided to the battery, the method comprising: detecting attachment of a USB device to the portable device; generating a start-up request signal; in response to the start-up request signal, determining whether power supplied by the battery meets a predetermined criterion; if the predetermined criterion is met, controlling the portable device to enter a USB connection mode for providing a USB connection; and if the predetermined criterion is not met, controlling the portable device to be in the charging mode and preventing the apparatus from entering the USB connection mode.

According to a third aspect of the present invention there is provided a computer program comprising program code means, preferably stored on a computer readable medium, the program code means being adapted to perform the method of the present invention when the program is executed by computing apparatus.

According to a fourth aspect of the present invention there is provided charging apparatus comprising: a power supply, for providing power to a battery; a detection circuit, for detecting attachment of a USB device to the portable device; an input for receiving a start-up indicator signal indicative of whether power supplied by the battery meets a predetermined criterion; and a control unit, operable: if it is detected that a USB device is attached, to generate a start-up request signal for requesting power-up of the portable device; in response to a negative indication at the input, to control the power supply to provide power to the battery and, after a predetermined delay, to generate a further start-up request signal; and in response to a positive indication at the input, to generate a charging status signal indicating whether the power supply is providing power to the battery.

According to a fifth aspect of the present invention there is provided apparatus comprising: an input for receiving a charging status signal indicating whether charging of a battery is ongoing; and a control unit operable: to determine whether power supplied by the battery meets a predetermined criterion; if it is determined that the predetermined criterion is met, to control power-up of a USB software unit; and if said charging status signal indicates that charging of the battery is ongoing, to prevent the USB software unit from detecting attachment of the USB device.

According to a sixth aspect of the present invention there is provided apparatus comprising: means for providing a physical connection to a USB device, means for detecting attachment of a USB device; means for charging a battery of a portable device using current drawn from a USB device, the means for charging being operable, if it is detected that a USB device is attached, to generate a start-up request signal; and wherein the apparatus has a charging mode in which power is provided by the means for charging to the battery, and a USB connection mode for providing a USB connection, and wherein the apparatus further comprises: control means, operable in response to the start-up request signal to determine whether power supplied by the battery meets a predetermined criterion, and operable, if it is determined that the predetermined criterion is not met, to control the apparatus to be in the charging mode and prevent the apparatus from entering the USB connection mode and operable, if it is determined that predetermined criterion is met, to control the apparatus to enter the USB connection mode.

According to a seventh aspect of the present invention there is provided charging apparatus comprising: means for providing power to a battery; means for detecting attachment of a USB device to the portable device; means for receiving a start-up indicator signal indicative of whether power supplied by the battery meets a predetermined criterion; and control means operable: if it is detected that a USB device is attached, to generate a start-up request signal for requesting power-up of the portable device; in response to a negative indication at the means for receiving, to control the power supply to provide power to the battery and, after a predetermined delay, to generate a further start-up request signal; and in response to a positive indication at the means for receiving, to generate a charging status signal indicating whether the power supply is providing power to the battery.

According to an eighth aspect of the present invention there is provided apparatus comprising: means for receiving a charging status signal indicative of whether charging of a battery is ongoing; and control means operable: to determine whether power supplied by the battery meets a predetermined criterion; if it is determined that the predetermined criterion is met, to control power-up of a USB software unit; and if said charging status signal indicates that charging of the battery is ongoing, to prevent the USB software unit from detecting attachment of the USB device.

Embodiments of the present invention will now be described by way of example only, with reference to the accompanying drawings in which.

In the Figures, reference numerals are re-used for like elements throughout.

Figure 3:
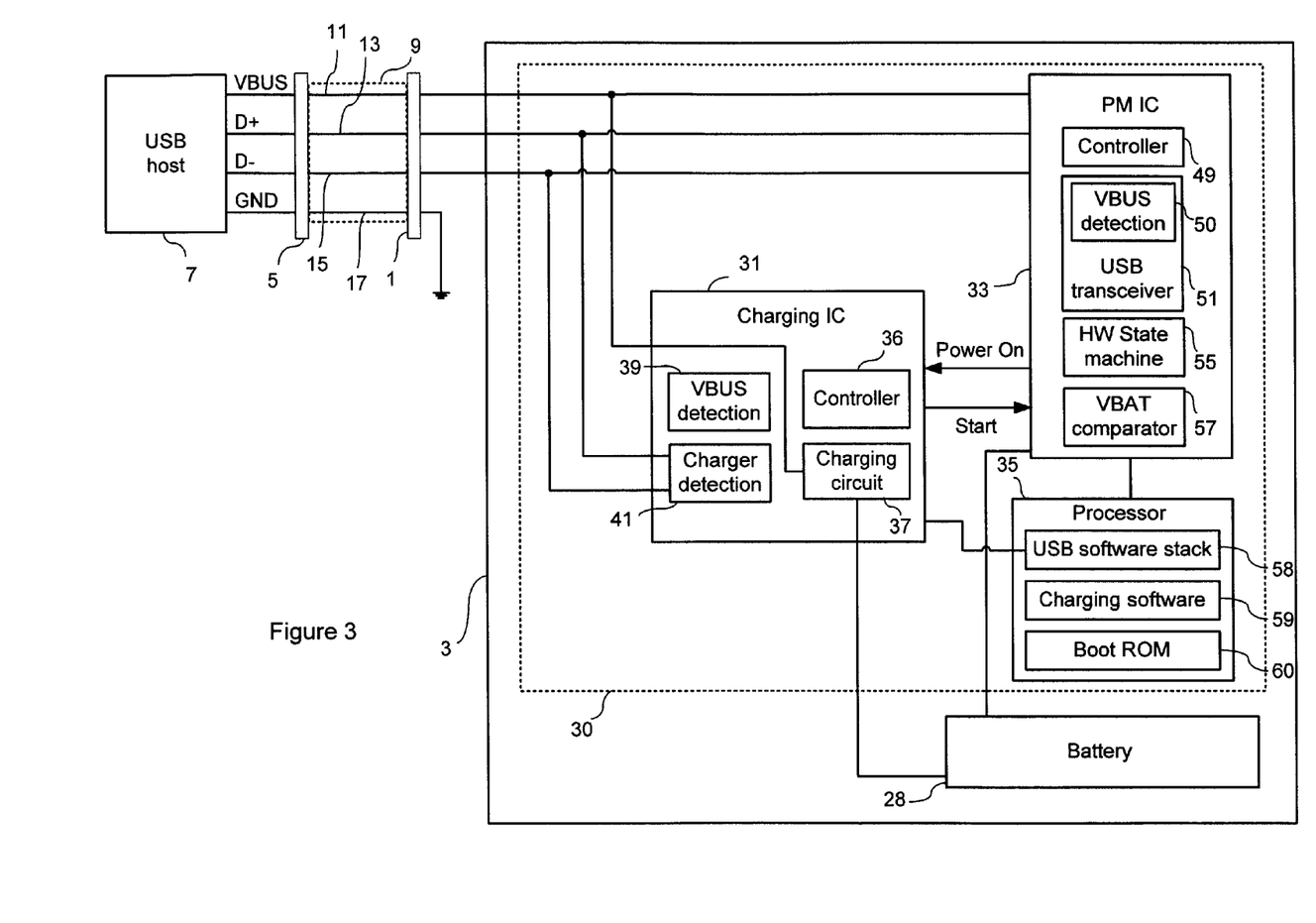
FIG. 3 is a schematic of a USB host connected to a portable device comprising apparatus according to the present invention.

Referring firstly to FIG. 3, a connector 1 of a portable device 3 is connected to a connector 5 of the USB host 7 via a USB cable 9. The connector 1 of the portable device 3, the connector 5 of the USB host 7, the USB host 7, and the connector 9 are substantially the same as in the prior art.

In this example, the USB host 7 is a PC. In other examples, the USB host 7 may be replaced with a USB charger or a USB hub.

The portable device 3 includes a rechargeable battery 28 and apparatus 30 for connecting the portable device 3 to the USB host 7. The apparatus 30 comprises a charging integrated circuit (IC) 31, a power management integrated circuit (PM IC) 33, and a processor 35.

The charging IC 31 comprises a first controller 36, a charging circuit 37, a VBUS detection circuit 39, and a charger detection circuit 41.

The first controller 36 is operable to control the other components of the charging IC 31. The first controller 36 is also operable to use information provided by the other components and received signals to generate an output signal Start.

The charging circuit 37 has an input connected to the VBUS line 11 of the USB cable 9. The charging circuit 37 converts voltage and current provided by the USB host 7 to values that are optimal for charging the battery 28. An output of the charging circuit 37 is connected to the battery 28, for providing current to the battery 28. The charging circuit 37 may be a switched mode power supply. Alternatively, the charging circuit 37 may be a linear power supply.

The VBUS detection circuit 39 is operable to detect voltage signals provided on the VBUS line 11, for determining whether a USB device such as the USB host 7 is attached to the connector 1 of the portable device 3.

The charger detection circuit 41 has first input connected to the D+ data line 13 and a second input connected to the D− data line 15. The charger detection circuit 41 is operable to detect the type of USB device i.e. whether the USB device is a USB host 7, a USB charger or a USB hub. The charger detection circuit 41 can determine whether the USB host 7 is a USB charger, a host or a hub by driving one of the data lines 13, 15 and detecting a response characteristic of the type of USB device.

The PM IC 33 can be an application specific integrated circuit (ASIC). The PM IC 33 comprises a second controller 49, a VBUS detection circuit 50 on a USB transceiver 51, a hardware (HW) state machine 55, and a VBAT comparator 57. The PM IC 33 has a first input connected to the VBUS line 11. The PM IC 33 has first and second input/outputs connected to the D+ and D− data lines 13, 15 respectively.

The second controller 49 is operable to control the other components of the PM IC 33. The second controller 49 is also operable to use information provided by the other components and received signals to generate an output signal PowerOn.

Similarly to the VBUS detection circuit 39 of the charging IC 31, the VBUS detection circuit 50 of the PM IC 33 is operable to detect voltage signals provided on the VBUS line 11, for determining whether a USB device such as the USB host 7 is attached to the connector 1 of the portable device 3.

The USB transceiver 51 is operable to transmit and receive USB data signals over the D+ and D− data lines 13, 15.

The HW state machine 55 controls power up and power down sequencing of portable device 3, including powering up of the processor 35.

The VBAT comparator 57 is operable to compare the voltage of the battery (VBAT) with a predetermined voltage, VBatLimit. The voltage VBatLimit corresponds to the minimum voltage level of the battery that allows the battery to provide enough power to start-up the portable device 3.

The processor 35 is not directly connected to any of the VBUS line 11, the D+ data line 13, or the D− data line 15. The processor 35 has a first input/output connected to an input/output of the PM IC 33 for transmitting and receiving control signals for USB data transfer, and for transmitting and receiving data for transfer. The processor 35 has a second input/output connected to an input/output of the charging IC 31.

The charging IC 31 communicates with the processor 35 by means of an I2C (inter-integrated circuit) interface. Thus, information about whether the VBUS line 11 is present is transferred using I2C. The I2C interface is not functional when the portable device 3 is not powered.

The PM IC 33 communicates with the processor 31 by means of a ULPI (UTMI+Low Pin Interface) (not shown). Thus, information about whether the VBUS line 11 is present is transferred using the ULPI interface. The ULPI interface is not functional when the portable device 3 is not powered. In other examples, an SPI (Serial Peripheral Interface) can be used instead of, or in addition to, the ULPI.

The processor 35 comprises a USB software stack 58, charging software 59 and a Boot Read Only Memory (ROM) 60. The USB software stack 58 provides control signals to the USB transceiver 51 for controlling transfer of data between the portable device 3 and the USB host 7. The USB software stack 58 includes information for ensuring that the portable device 3 is compliant with the USB specification, such as current limitations and time delays.

The charging software 59 controls the charging IC 31 to charge the battery 28 in accordance with the USB specification, for example by controlling the charging IC 31 to draw a maximum current of 2.5 mA during suspend mode. The charging software 59 is operable to communicate with the USB software stack 58 for receiving information about the current limitations for charging.

In another embodiment (not shown), the charging software 59 is provided on a second processor, and the processor 35 and second processor are operable to communicate with each other.

The Boot ROM 60 stores code executable by the processor 35 for entering the portable device 3 into the USB connection mode. The Boot ROM 60 enters the portable device 3 into connection mode in response to information received over the ULPI interface. This information indicates that a voltage is being provided over the VBUS line 11, indicating that a USB device such the USB host 7 is attached. In another embodiment (not shown) the Boot ROM 60 enters the portable device 3 into connection mode in response to an interrupt received from the charging IC 31.

In some portable devices 3, the processor 35 is not provided with some or all of the software. This can include the USB software stack 58, the charging software 59 and other non-USB specific software, for example software for playing music. The Boot ROM 60 also provides code, which when executed by the processor 35 checks if there is a request from the USB host 7 to update the software. If this is the case, the necessary software is downloaded during start-up of the portable device 3, and is installed on the processor 35 by means of flash programming via USB.

The Boot ROM 60 may not be capable of controlling the charging IC 31 to charge the battery 28 in line with the limitations imposed by the USB specification.

The PM IC 33 is operable to provide a signal PowerOn to the charging IC 31. The PowerOn signal indicates whether the PM IC 33 has powered-up the portable device 3.

The apparatus 30 can provide connection of the portable device 3 to the USB host 7 even in the case of an initially dead or weak battery 28. Here, a dead battery is defined as one that is below the dead battery threshold. The dead battery threshold is defined as the maximum charge level of a battery such that, below this threshold, a device is assured of not being able to power up successfully. A weak battery is defined as one that is above the dead battery threshold and below the weak battery threshold. The weak battery threshold is defined as the minimum charge level of a battery such that, above this threshold, the device is assured of being able to power up successfully. A device with a weak battery may or may not be able to power up a device successfully.

The apparatus 30 is operable to provide hardware-controlled charging of the battery 28 before power-up of the processor 35 and connection to the USB host 7. Connection to the USB host 7 is only allowed once it is determined that the battery 28 has sufficient stored energy to power up the portable device 3, and keep the portable device 3 powered for the duration of the USB connection procedure.

Figure 4A:
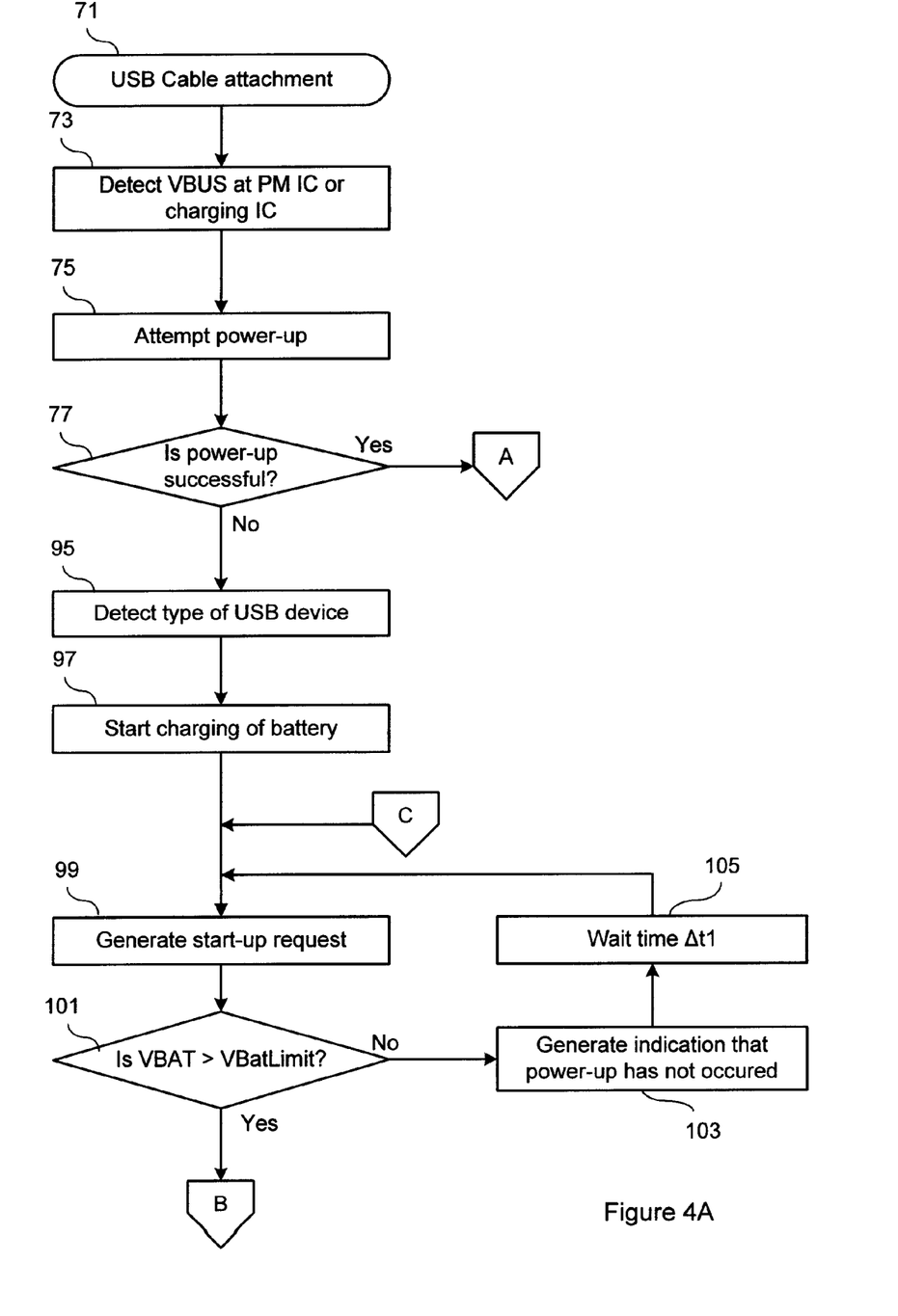
FIGS. 4A, 4B and 4C are flow diagrams of a method for connecting the FIG. 3 apparatus to a USB host according to the present invention.

Referring now to FIG. 4A and FIG. 3, an operation for connecting the portable device 3 to the USB host 7 begins at step 71 when the cable 11 is attached the portable device 3. At step 73, one or both of the charging IC 31 and the PM IC 33 detect attachment of the cable 11 using their respective VBUS detection circuits 39, 50. At step 75, this causes PM IC 33 to try to power up.

At step 77, the charging IC 31 determines whether the PM IC 33 has been able to power successfully on the basis of the PowerOn signal. If the charging IC 31 determines that the PM IC 33 has been able to power up the portable device 3 successfully, the operation proceeds to step 79. When the portable device 3 is powered up, the ULPI interface is functional.

Figure 4B:
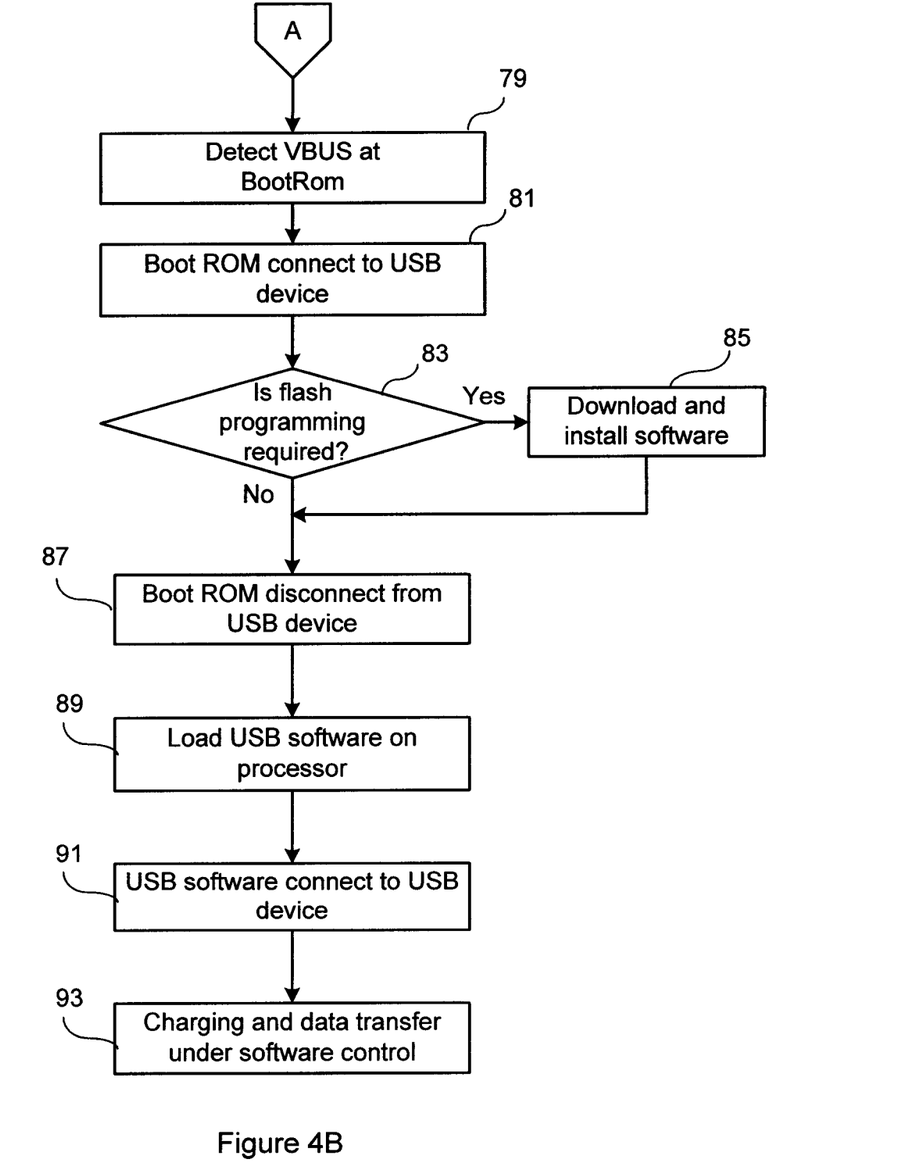

Referring now to FIG. 4B and FIG. 3, at step 79, the Boot ROM 60 on the processor 35 detects the presence of a high signal on the VBUS line 11 by means of an indication over the ULPI interface or from the charging IC 31. At step 81, the processor 35 executes code on the Boot ROM 60 to control connection of the portable device 3 to the USB host 7, using a method similar to that described with reference to FIG. 2.

At step 83, the Boot ROM 60 determines whether flash programming of the processor 35 is required. Flash programming may be requested by the USB host 7 when there is no software and/or firmware installed on the processor 35, for example in the case of a new portable device 3. Flash programming may also be requested by the USB host 7 if it is necessary to update the version of the software and/or firmware on the processor 35. If it is determined that flash programming is required, the operation proceeds to step 85. At step 85, the necessary software is downloaded from the USB host 7 and installed on the processor 35 controlled by code on the Boot ROM 60. The operation then proceeds to step 87.

If instead it is determined that flash programming is not required, the operation proceeds straight to step 87.

At step 87, the Boot ROM 60 is disconnected from the USB device 7. At step 89, the USB software is loaded on the processor 35. At step 91, the USB software 58 connects to the USB device, also using a method similar to that described above with reference to FIG. 2. At step 93, charging and USB data transfer can be performed in accordance with the USB specification, OTG supplement and USB battery charging specification, under software control.

If instead at step 77 the charging IC 31 determines that the PM IC 33 has not been able to power up successfully, the operation proceeds to step 95 (FIG. 4A). At step 95, the charging IC 31 determines the type of USB device using the charger detection circuit 41.

At step 97 the charging IC 31 commences charging of the battery 28 using the charging circuit 37. The duration of charging at step 97 can be dependent on the type of USB device that was detected at step 95. For example, the duration of charging may be longer if it is determined that the USB device is a USB host than if it is determined that the USB device is a dedicated charger.

After a predetermined duration, at step 99, the charging IC 31 then generates a start-up request signal Start and transmits the signal to the PM IC 33. In response to the start up request, at step 101 the PM IC 33 determines whether VBAT is more than the predetermined threshold value, VBatLimit. VBatLimit corresponds to the minimum voltage level of the battery 28 that indicates that the battery 28 might have enough stored energy to power-up the portable device 3 successfully i.e. VBatLimit corresponds to the dead battery threshold.

If the PM IC 33 determines that VBAT is less than VBatLimit, the operation proceeds to step 103. At step 103, the PM IC 33 indicates to the charging IC 31 that it has not been able to power-up. At step 105, the charging IC 31 waits for the predetermined duration Δt1 and continues charging. The operation then returns to step 99.

If instead at step 101 the PM IC 33 determines that the voltage level of the battery 28 is more than VBatLimit, the operation proceeds to step 107.

Figure 4C:
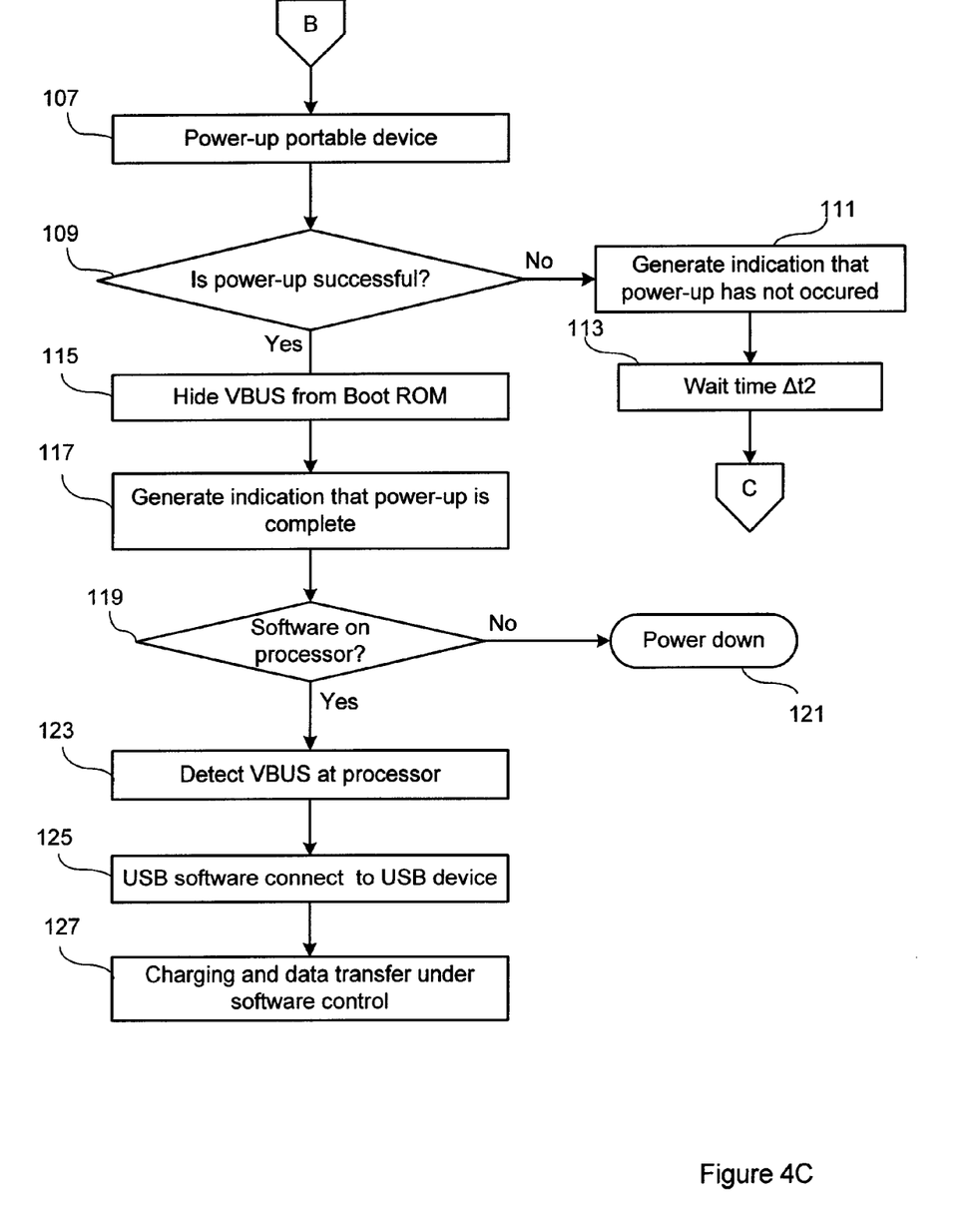

Referring now to FIG. 4C and FIG. 3, at step 107 the HW state machine 55 of the PM IC 33 controls power up of the portable device 3, including power up of the USB software stack 58 and the charging software 59 of the processor 35, and the ULPI interface.

At step 109, the PM IC 33 determines if power-up was successful. Power-up may not have been successful as the battery 28 may be between the dead battery threshold and the weak battery threshold. If power-up was not successful, at step 111 the PM IC 33 indicates to the charging IC 31 that it has not been able to power-up by means of the PowerOn signal. At step 113, the charging IC 31 waits for a predetermined duration Δt2 and continues charging. The operation then returns to step 99 (FIG. 4A).

If power-up was successful the operation proceeds to step 115. Since power-up was successful, the ULPI interface is functional. At step 115, the PM IC 33 hides the VBUS signal from the Boot ROM 60 on the processor 35. This is because, if the Boot ROM 60 was to detect a high VBUS signal using the ULPI interface, the Boot ROM 60 would cause the USB connection procedure to commence.

At step 117, the PM IC 33 indicates to the charging IC 31 that power-up of the portable device 3 is complete by means of the PowerOn signal. At step 119, it is determined whether the USB software stack 58 and the charging software 59 are present on the processor 35 (the USB software stack 58 and the charging software 59 may not be present until after flash programming). In this example, charging of the battery 28 continues for a predetermined duration. The predetermined duration may be long enough to ensure that the charge level of the battery 28 corresponds to the weak battery threshold. If charging software 59 does not take over control of charging within the predetermined duration, it is determined that there is no software present, and the operation proceeds to step 121. At step 121, the portable device 3 is powered down by the PM IC 33 or the Boot ROM 60, since there is no software to control the charging IC 31 during USB connection.

If instead it is determined that the USB software stack 58 and the charging software 59 are present on the processor 35, the operation proceeds to step 123. At step 123, the USB software stack 58 and the charging software 59 are in control of the portable device 3, and the USB software stack 58 detects the presence of a high signal on the VBUS line 11. At step 125, this causes the USB software stack 58 to connect to the USB device 7. During connection the charging software 59 controls the charging IC 31 to draw current within the limitations of the USB specification.

At step 127, charging and USB data transfer can be performed in accordance with the USB specification, OTG supplement and USB battery charging specification, under software control.

Figure 5:
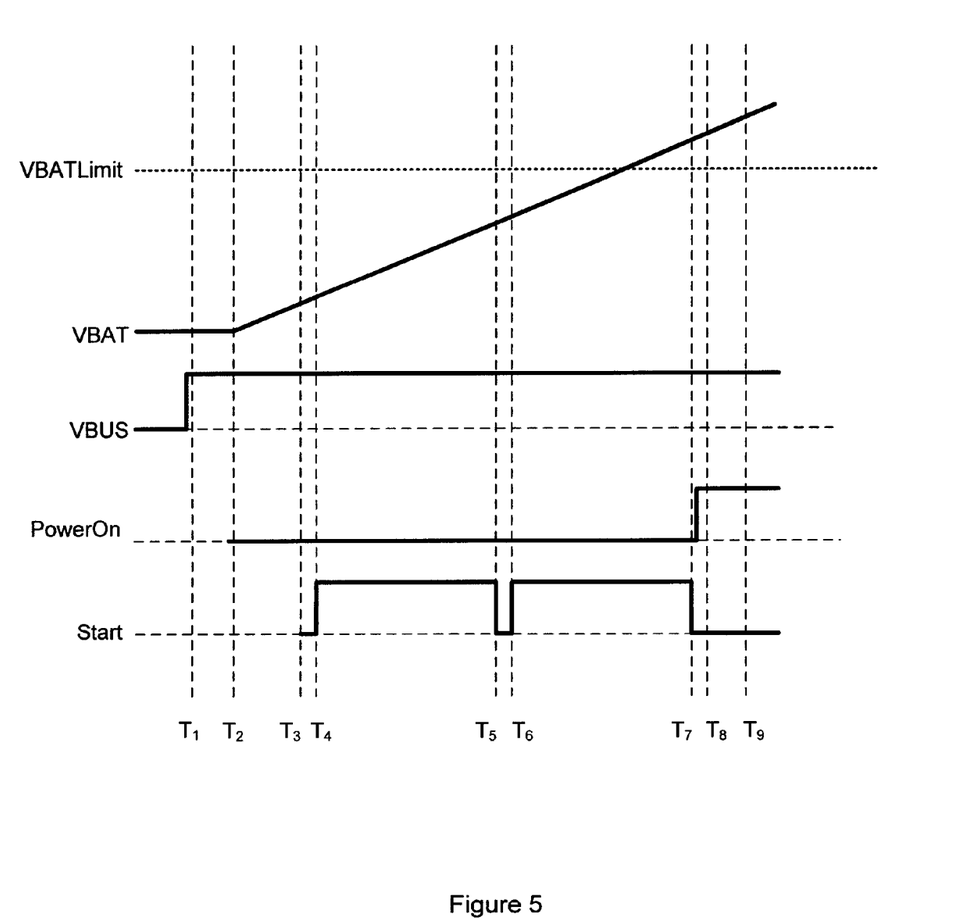
FIG. 5 illustrates signals generated by the FIG. 3 apparatus.

Referring now to FIG. 5, signals used to control the above-described operation comprise the VBUS signal provided by the USB host 7, the PowerOn signal provided by the PM IC 33 to the charging IC 31, and the Start signal provided by the charging IC 31 to the PM IC 33. The measured voltage level of the battery 28, VBAT, also is used to control the operation.

The signal PowerOn indicates to the charging IC 31 whether the PM IC 33 has been able to power up the portable device 3 successfully. If the portable device 3 is not powered, PowerOn is low. If the portable device 3 has been powered up successfully, the PowerOn signal is high. In this example, the portable device 3 is determined to be powered if the processor 35 is powered. In other examples, the portable device 3 may be determined to be powered if the processor 35 in addition to other components, for example a display, are powered.

The Start signal has two functions. When the PowerOn signal is low, the Start signal is used to send a start up request to the PM IC 33. The falling edge of the Start signal indicates to the PM IC 33 that start-up of the portable device is being requested by the charging IC 31. When PowerOn is high, the Start signal indicates to the PM IC 33 whether charging is ongoing. If the Start signal is low, this indicates that the charging IC 31 is charging the battery 28. If the Start signal is high, this indicates to the PM IC 33 that the charging IC 31 is not charging the battery 28.

The operation starts when the USB host 7 is attached to the portable device 3. This results in a high voltage signal on the VBUS line 11 at the charging IC 31 and the PM IC 33. At time $T_1$, this is detected at the PM IC 33, and the PM IC 33 attempts to power up. However, at time $T_1$, VBAT is less than VBatLimit, and the PM IC 33 is not able to power up portable device 3. Thus, PowerOn stays low.

This is detected by the charging IC 31, and at time $T_2$ charging of the battery 28 is started by the charging IC 31.

At time $T_3$, the Start signal is activated. The charging IC 31 waits a fixed delay. The time delay is sufficient to allow the PM IC 33 to control power up of the portable device 3. At time $T_4$, the charging IC 31 controls Start to be high because PowerOn remains low. The Start signal remains high for a given time delay.

At time $T_5$ the charger IC 31 activates the Start signal again, and controls the Start signal to be low. The PM IC 33 detects the falling edge of the Start signal as a start-up request, but because VBAT is still less than VBatLimit, it control PowerOn to stay low. The charging IC 31 waits a fixed delay. At time $T_6$, the charging IC 31 controls the Start signal to be high because PowerOn remains low. The time delay is sufficient to allow the PM IC 33 to control power up of the portable device 3.

After a given time delay, at time $T_7$, the charging IC 31 generates another start-up request by controlling Start to be low.

This time the VBAT is more than VBatLimit, so the PM IC 33 controls power up of the portable device 3. This is completed within the time delay allowed by the charging IC 31, and the PM IC 33 controls PowerOn to be high.

At time $T_8$, after the given time delay, the charging IC 31 determines that PowerOn is now high. As described above, Start now has the function of indicating to the PM IC 33 whether charging is ongoing. In this case, charging is ongoing, thus the charging IC 31 controls Start to remain low. As charging is ongoing, the PM IC 33 hides VBUS from the processor 35. Thus, the Boot ROM 60 does not detect the USB host 7 and does not try to connect with it.

At time $T_9$, the processor 35 loads and runs the operating system, the USB software stack 58 and the charging software 59 and after a time delay has full software control of the system. It can thus decide to disable the hiding of VBUS and allow connection with the USB host 7. In this example, the charging software 59 can control the charging IC to continue charging until the weak battery threshold is reached. The PM IC 33 then stops hiding VBUS from the processor 35. The ULPI interface reveals a high voltage signal on the VBUS line 11, and this causes the USB software stack 58 on the processor 35 to enumerate.

During connection and enumeration, the charging software 59 controls the charging IC 31 to draw a current that is not more than the suspend mode current when the portable device 3 is required to enter suspend mode. After the connection and enumeration procedure is complete, the charging software 59 on the processor 35 controls the charging IC 31 to charge the battery 28 in accordance with the current limitations imposed by the USB specification.

The above-described embodiment ensures that USB connection is not commenced until there is enough energy stored in the battery to ensure that connection can take place. Thus, dead or weak batteries can be connected according to the USB specification. Advantageously, the invention also allows flash programming via USB. If flash programming is required, it is carried out after connection of the Boot ROM 60 with the USB host 7, where the Boot ROM 60 provides a USB connection without software control.

As flash programming is not carried out if the battery 28 does not have enough stored energy to power up the portable device 3, charging of the battery 28 is not required during connection of the Boot ROM 60. Thus the charging IC 31 is not drawing current from the USB host 7, so software is not required to control the charging IC 31 to draw current within the limitations of the USB specification. After flash programming is complete, charging and USB data transfer can be software controlled.

It will appreciated that other indications can be used by the PM IC 33 and charging IC 31 to indicate the charging status, generate the start up requests, and indicate whether the portable device can be powered up. For example, a rising edge of the Start signal may be used to denote a start-up request or another dedicated signal may be used.

In the above example, it was determined that the USB device was a USB host 7. If instead it is determined that the USB device is a USB hub, an OTG portable device or a dedicated charger, the charging may be modified. For example, the charging current drawn from the USB device may be 500 mA instead of 100 mA.

In the above example a controller is provided on each of charging IC 31 and the PM IC 33. In other examples, a discrete controller may be provided to control the functions of both of the charging IC 31 and the PM IC 33. In addition, in other examples, the charging IC 31 and the PM IC 33 may form a single circuit.

In the above-described method, the PM IC 33 first attempts power-up in response to detecting attachment of the USB host 7. In another example, the PM IC 33 may first attempt power-up in response to a signal from the charging IC 31, or charging may be started by the charging IC 31 before power-up is attempted. If charging is started by the charging IC 31 before power-up is attempted, and at step 77 power-up is successful, charging is stopped before the Boot ROM 60 commences enumeration.

In another example, if it is determined at step 119 that there is no software on the processor 35, charging can be continued for a predetermined duration to ensure that there is enough stored energy in the battery 28 to power the portable device 3 for flash programming. After charging for the predetermined period, the Boot ROM 60 may then connect the USB device and perform flash programming. Thus, flash programming may be carried out even in the case of a dead or weak battery.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

For example, the USB transceiver 51 may be provided on the processor 35 instead of on the PM IC 33, or may be provided on a separate chip. In addition, the VBAT comparator can be provided on the charging IC 31 instead of on the PM IC 33. The USB host 7 can be replaced with a USB hub, a dedicated USB charger on an OTG portable device. In other examples, it is possible for the charger detection circuit 41 to be removed, and the same method to be followed for all types of USB device. Alternatively, the charger detection step can instead be carried out straight after detection of a voltage on the VBUS line 11 (i.e. after step 73 in FIG. 4A).

The invention claimed is:

1. Apparatus comprising:
a connector, for providing a physical connection to a USB device,
   a detection circuit, operable to detect attachment of a USB device;
   a charging circuit, for charging a battery of a portable device using current drawn from a USB device, the charging circuit being operable, if it is detected that a USB device is attached, to generate a start-up request signal;
   wherein the apparatus has a charging mode in which power is provided by the charging circuit to the battery, and a USB connection mode for providing a USB connection made between the USB device and the portable device when the portable device drives a data line to communicate with the USB device, and wherein the apparatus further comprises:
   a control unit, operable in response to the start-up request signal to determine whether a charge level of the battery meets a predetermined criterion, and operable, if it is determined that the predetermined criterion is not met, to control the apparatus to be in the charging mode and prevent the apparatus from entering the USB connection mode and operable, if it is determined that predetermined criterion is met, to control the apparatus to enter the USB connection mode.

2. Apparatus as claimed in claim 1, wherein the control unit is operable to provide a battery status signal to the charging circuit, the battery status signal indicating whether the predetermined criterion is met.

3. Apparatus as claimed in claim 1, wherein the charging circuit is operable, if the predetermined criterion is met, to provide a charging status signal to the control unit, the charging status signal indicating whether the apparatus is in the charging mode and wherein the control unit is operable, if the charging status signal indicates the apparatus is in the charging mode, to prevent the apparatus from entering the USB connection mode.

4. Apparatus as claimed in claim 1, wherein the control unit is further operable to control powering-up of the portable device prior to entering the USB connection mode.

5. Apparatus as claimed in claim 4, wherein the control unit comprises a hardware state machine for controlling powering-up of the portable device.

6. Apparatus as claimed in claim 4, wherein the predetermined criterion is that the charge level of the battery is sufficient to power-up the portable device.

7. Apparatus as claimed in claim 1, wherein the predetermined criterion is that the charge level of the battery is sufficient to power the portable device for the duration of the USB connection mode.

8. Apparatus as claimed in claim 1, wherein the charging circuit comprises charging hardware, and wherein the charging hardware and the control unit control the charging mode without the involvement of software.

9. Apparatus as claimed in claim 1, wherein the control unit is operable to enter the apparatus into a second charging mode after completion of the connection mode, and wherein the apparatus further comprises charging software, the charging software being operable to control the charging circuit in the second charging mode.

10. Apparatus as claimed in claim 1, wherein the apparatus further comprises USB connection hardware and wherein the control unit is further operable to prevent the USB connection hardware from detecting attachment of the USB device whilst the apparatus is in the charging mode.

11. Apparatus as claimed in claim 1, further comprising a voltage comparator, the voltage comparator being operable to determine whether the power level of the battery meets a predetermined criterion by determining whether the voltage level of the battery is more than a threshold value.

12. Apparatus as claimed in claim 1, further comprising a charger detection circuit, operable in response to detecting attachment of a USB device to the connector to determine the type of USB device.

13. A portable device comprising apparatus as claimed in claim 1 and a battery.

14. A method of controlling a portable device comprising a battery, the portable device having a charging mode in which power is provided to the battery, the method comprising:
- detecting attachment of a USB device to the portable device;
- generating a start-up request signal;
- in response to the start-up request signal, determining whether a charge level of the battery meets a predetermined criterion;
- if the predetermined criterion is met, controlling the portable device to enter a USB connection mode for providing a USB connection made between the USB device and the portable device when the portable device drives a data line to communicate with the USB device; and if the predetermined criterion is not met, controlling the portable device to be in the charging mode and preventing the apparatus from entering the USB connection mode.

15. A method as claimed in claim 14, wherein the determining step comprises attempting to power-up the portable device.

16. A method as claimed in claim 14, wherein the determining step comprises measuring the voltage level of the battery.

17. A non-transitory computer program comprising program code, stored on a computer readable medium, the program code means being adapted to perform the method of claims 14 when the program is executed by computing apparatus.

18. Charging apparatus comprising:
- a power supply, for providing power to a battery;
- a detection circuit, for detecting attachment of a USB device to the portable device;
- an input for receiving a start-up indicator signal indicative of whether a charge level of the battery meets a predetermined criterion; and
- a control unit, operable:
- if it is detected that a USB device is attached, to generate a start-up request signal for requesting power-up of the portable device;
- in response to a negative indication at the input, to control the power supply to provide power to the battery and, after a predetermined delay, to generate a further start-up request signal; and
- in response to a positive indication at the input, to generate a charging status signal indicating whether the power supply is providing power to the battery.

19. Apparatus comprising:
- an input for receiving a charging status signal indicating whether charging of a battery is ongoing; and
- a control unit operable:
- to determine whether a charge level of the battery meets a predetermined criterion;
- if it is determined that the predetermined criterion is met, to control power-up of a USB software unit; and
- if said charging status signal indicates that charging of the battery is ongoing, to prevent the USB software unit from detecting attachment of the USB device.

20. Apparatus as claimed in claim 19, wherein the input is also operable to receive a start-up request signal, and wherein the control unit is operable to determine whether the charge level of the battery meets the predetermined criterion in response to said start-up request signal.

* * * * *